UNITED STATES PATENT OFFICE.

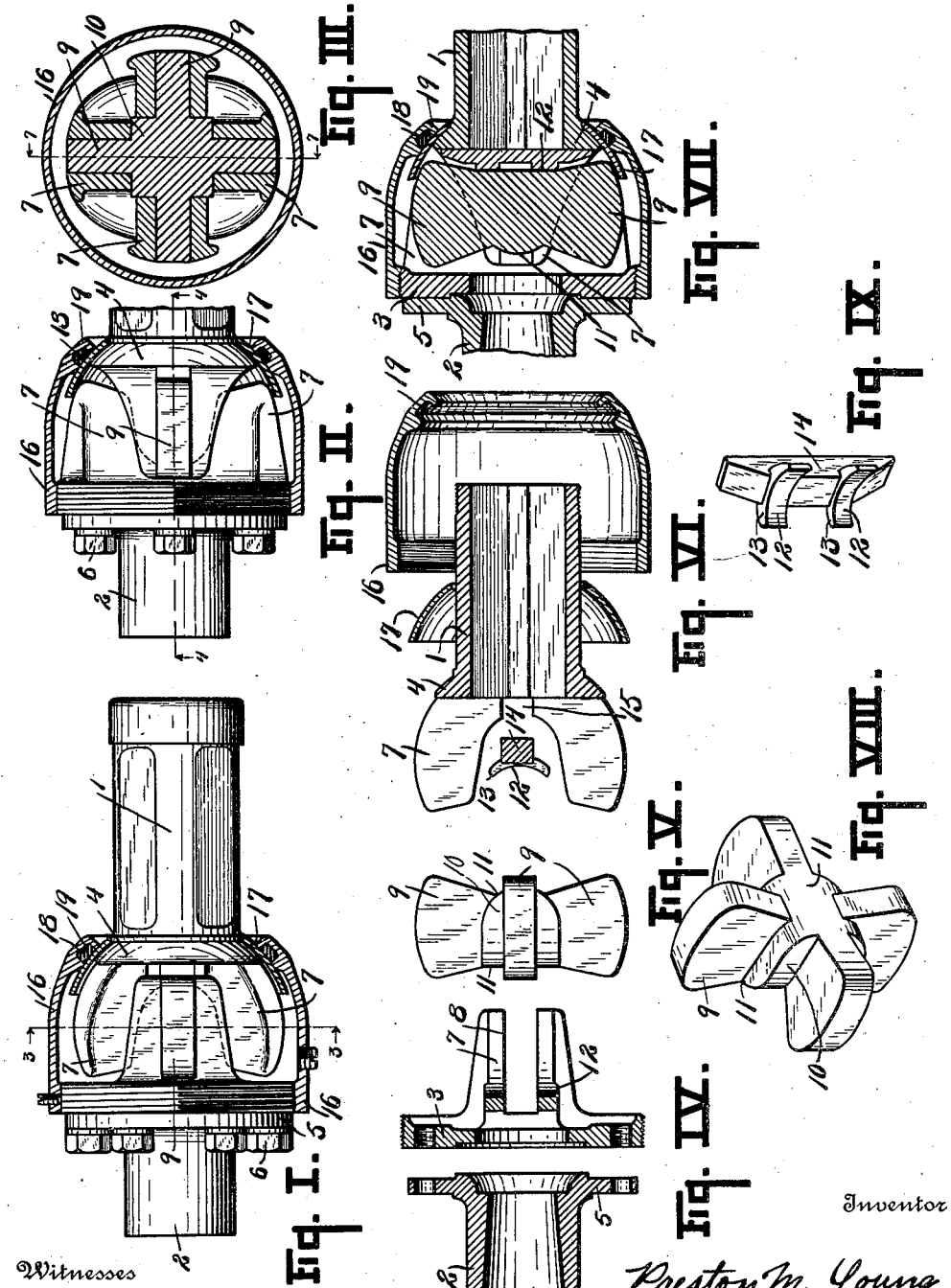

PRESTON M. YOUNG, OF JACKSON, MICHIGAN.

UNIVERSAL JOINT.

1,111,781.   Specification of Letters Patent.   Patented Sept. 29, 1914.

Application filed March 28, 1912. Serial No. 686,854.

*To all whom it may concern:*

Be it known that I, PRESTON M. YOUNG, a citizen of the United States, residing at Jackson, Michigan, have invented certain new and useful Improvements in Universal Joints, of which the following is a specification.

This invention relates to improvements in universal joints.

The main objects of this invention are: First, to provide an improved universal joint which is very strong and durable and which is at the same time simple and compact in structure. Second, to provide an improved universal joint in which the bearing surfaces between the parts are of a relatively large area and one in which this area of bearing surface or contact is not materially lessened by the wearing of the joint. Third, to provide an improved universal joint in which the bearing members are effectively incased. Fourth, to provide an improved universal join in which the bearings are effectively lubricated.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side elevation of a structure embodying the features of my invention with the casing members 16 and 17 shown in longitudinal central section. Fig. II is a detail side elevation of the structure shown in Fig. I turned one-quarter way around, the casing members 16 and 17 being shown in central longitudinal section. Fig. III is a transverse section taken on a line corresponding to line 3—3 of Fig. I. Fig. IV is a central longitudinal section taken on a line corresponding to line 4—4 of Fig. II, through the parts of the member 2 disconnected or separated, the better to show their form. Fig. V is a side elevation of the coupling member 10. Fig. VI is a central longitudinal section corresponding to that of Fig. IV of the members 1, 14, 16 and 17 separated to better illustrate their form. Fig. VII is a detail longitudinal section taken on a line corresponding to line 7—7 of Fig. III. Fig. VIII is a perspective view of the coupling member 10. Fig. IX is a perspective view of the bearing member 14.

In the drawing, similar reference characters refer to similar parts throughout the several views, and the sectional views are taken looking in the direction of the little arrows at the ends of the section lines.

Referring to the drawing, the structure illustrated comprises shaft members 1 and 2, one of which is the driving and the other the driven member. Either may be made the driving member. The member 2 is provided with a detachable head 3, while the head 4 of the member 1 is, in the structure illustrated, formed integrally therewith. The head 3 is disk-like in form and is secured to the flange 5 by the screws 6. The shaft members are provided with bearing arms or forks 7 slotted at 8 to provide slot-like bearings for the cross arms 9 of the coupling member 10. The coupling member 10 is provided with transversely disposed curved bearings 11 at its ends, while the shaft members have curved bearing surfaces 12 coacting with the bearings between the arms 7 coacting with the bearings 11. The sides of the cross arms are provided with bearing surfaces coacting with the sides of the bearing slots 8.

For convenience in manufacture, the shaft member 1 is provided with bearing members 13 having bearing surfaces 12 therein. These bearing members 13 are supported by the block 14 which is arranged in the transverse slot 15 in the member 1.

The parts are held in their assembled relation and incased by the casing member 16 which is threaded upon the head 3. The member 16 embraces the spherically curved collar-like casing member 17 which is sleeved upon the member 1 to engage the head 4. The member 16 is provided with the gasket 18, which is seated in a groove 19, as clearly shown in the drawings. With the parts thus arranged, the power is transmitted from the driving and the driven member through the coupling member, both members pivoting about the center of the coupling member on the bearings 11. The drive is transmitted through the cross arms which provide a relatively large bearing surface which is not materially changed or modified by wearing of the joints. The parts are effectively incased and the casing forms an effective lubricant receptacle.

My improved joint is very economical to produce and is compact and durable, and as stated, a large bearing surface is provided between the parts. The parts are comparatively massive and the joint is capable of transmitting heavy loads and sustaining great strains.

I have illustrated and described my improved joint in detail in the form in which I have embodied the same. I have not attempted to illustrate the various modifications of structural details of which my improvements are capable as such variations will be undoubtedly readily understood by those skilled in the art to which this invention relates. I desire, however, to be understood as claiming the same specifically in the form illustrated, as well as broadly within the scope of the appended claims.

Having thus described my invention, what I claim as new and desire to secure by Letters Patent is:

1. In a universal joint, the combination of the driving and driven members each having a pair of arms provided with longitudinal slot-like bearings and curved bearing surfaces between the arms, and a coupling member having transversely disposed curved bearings coacting with the bearing surfaces between the arms of said driving and driven members and pairs of flat radially disposed cross arms disposed in said slot-like bearings of said driving and driven member arms.

2. In a universal joint, the combination of the driving and driven members each having a pair of longitudinally slotted arms and curved bearing surfaces between the arms, and a coupling member having transversely disposed curved bearings at its ends coacting with said bearing surfaces between the arms of said driving and driven members and pairs of radially disposed cross arms engaging the said slots thereof.

3. In a universal joint, the combination of the driving and driven members, each provided with a pair of arms and curved bearing surfaces between the arms, the arms being longitudinally slotted, and a coupling member having curved bearings at its ends coacting with the bearing surfaces between said driving and driven member arms and pairs of flat radially disposed cross arms engaging said slots of said driving and driven members, the sides of the cross arms being in bearing engagement with the sides of the slots.

4. In a universal joint, the combination of the driving and driven members, and a coupling member having pairs of radially disposed cross arms engaging said driving and driven members and transversely disposed cylindrically curved segmental end bearings, said driving and driven members being provided with cylindrically curved bearing seats for the said end bearings of said coupling member and with longitudinal slot-like bearings for the said radial arms thereof.

5. In a universal joint, the combination of the driving and driven members each having a pair of arms provided with longitudinal slot-like bearings and curved bearing surfaces between the arms, and a coupling member having pairs of radially disposed cross arms disposed in said slot-like bearings of said driving and driven member arms and curved end bearings coacting with the bearing surfaces between the arms of said driving and driven members.

6. In a universal joint, the combination of the driving and driven members, each having a pair of arms provided with longitudinal slot-like bearings and cylindrically curved bearing surfaces between the arms, the slot-like bearings of one member being disposed at right angles to those of the other member, and a coupling member having pairs of flat radially disposed cross arms disposed in said slot-like bearings of said driving and driven member arms, and cylindrically curved end bearings coacting with the cylindrically curved bearing surfaces between the arms of said driving and driven members, said end bearings being continued at the sides of the coupling member arms, the curve of one end bearing being at right angles to the curve of the other.

7. In a universal joint, the combination of the driving and driven members, a spherical casing member on one of said members, an adjustable shell on the other member embracing said casing member and having bearing engagement therewith, and a coupling member having transversely disposed curved end bearings and pairs of radially disposed bearing arms, each of said driving and driven members being provided with curved bearing seats for said bearings and longitudinal slot-like bearings for said coupling member arms.

8. In a universal joint, the combination of the driving and driven members, a spherical casing on one of said members, a shell on the other member embracing said spherical casing and coacting therewith to provide a casing member, each of said driving and driven members having arms provided with longitudinal slot-like bearings and curved bearing surfaces between the arms, and a coupling member having transversely disposed curved end bearings coacting with the bearing surfaces between the arms of said driving and driven members, and pairs of flat radially disposed cross arms coacting with the slot-like bearings of said driving and driven member arms.

9. In a universal joint, the combination of the driving and driven members each having fork-like arms provided with longitudinal slot-like bearings and inwardly curved bearing surfaces between the arms, a coupling member having transversely-disposed, outwardly curved bearings coacting with the bearing surfaces between the arms of said driving and driven members and pairs of flat radially-disposed cross arms disposed in said slot-like bearings of said driving and driven member arms, the arms of said driving and driven members and of said coupling member being disposed in the same transverse plane, and a casing member carried by one of the said driving and driven members and having bearing engagement with the other whereby the parts are retained in their operative relation, said casing being adjustable, for the purpose specified.

In witness whereof, I have hereunto set my hand and seal in the presence of two witnesses.

PRESTON M. YOUNG. [L. S.]

Witnesses:
J. LEWIS PELHAM,
LOUIS BODINE.